Dec. 11, 1928.
J. LEDWINKA
1,694,825
AUTOMOBILE DOOR
Filed May 3, 1922
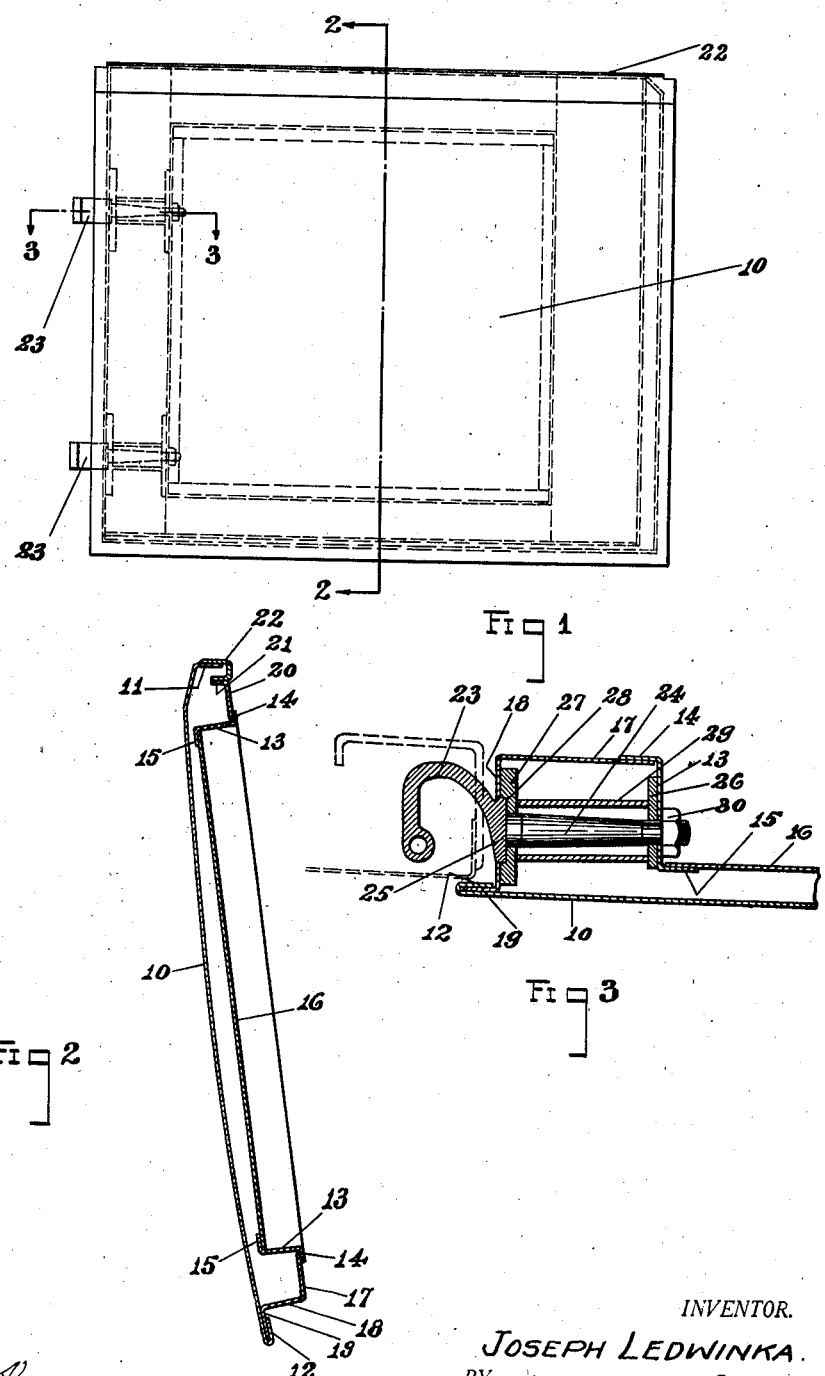
INVENTOR.
JOSEPH LEDWINKA.
BY
ATTORNEY.

Patented Dec. 11, 1928.

1,694,825

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

AUTOMOBILE DOOR.

Application filed May 3, 1922. Serial No. 558,169.

My invention relates to improvements in automobile doors and, more particularly, to doors of the type employed on open automobile bodies.

The principal object of my invention is to provide an automobile door which is particularly strong and rigid, even where there is a considerable curvature of the door panel in order to conform to the curvature of the body on which the door is used.

Scarcely second to the principal object of my invention is the aim to simplify and cheapen the structure. This aim is directed alike to the cutting down of the amount of material used and the expense of die-pressing the individual parts, and to the fabrication of these parts into the completed whole. Into this latter comes the factor of economical welding of the parts together. The welding lines and spots must not only be where they can be readily reached but such that when completed they materially strengthen and stiffen the structure wherever possible in addition to merely joining it together.

Another object of the invention is to eliminate curved lines from all parts where they are not essential. Curved lines are an essential in the main only in the outer panel of the door which, of course, must conform in contour to the contour of the body at large.

Another object of my invention is to provide an automobile door having an improved mounting for the hinges, of such a nature that the hinges may be mounted or removed after the door has been assembled, and in which the hinge is largely concealed within the door construction.

A further object of my invention is to provide an improved mounting for the hinges of automobile doors of such a nature as to reinforce the door at the points where the hinges are applied, so as to prevent the distortion of the door by the stresses and strains transmitted to it by the hinges.

Further objects, and objects relating to details and economies of operation and construction, will definitely appear from the detailed description to follow. In one instance, I accomplish the objects of my invention by the devices and means described in the following specification. My invention is clearly defined and pointed out in the appended claims. A preferred embodiment of my invention is illustrated in the accompanying drawings, forming a part of this specification, in which:

Fig. 1 is a view in side elevation of a door embodying my invention.

Fig. 2 is a sectional view through the door, taken on the line 2—2 of Fig. 1, and Fig. 3 is a sectional view through the door at one of the hinges, taken on the line 3—3 of Fig. 1.

In the drawings, the same reference numerals refer to the same parts throughout the several views and the sectional views are taken looking in the direction of the arrows at the ends of the section lines.

In general, my invention consists in making an all-metal door for automobile bodies, by providing a main door frame, which may be made of a plurality of angle members rigidly secured together, a plurality of sheet metal panel-supporting members rigidly secured to said frame, and a door panel having the edge portions thereof rigidly secured to said panel-supporting members. If desired, a sheet of metal may be secured to the said frame so as to form a bottom for the pocket of which the frame forms the side walls. The panel-supporting members secured to the door frame are of such shape as to form channels at the side portions of the door and I may secure the hinges in place by providing them with shanks extending completely through such channel portion to the inner side of the door frame, where a fastening member may be secured to it. I find it desirable to provide spacing and reinforcing means within the channel, adjacent said shanks. The fastening member which secures the hinge in place is not located within the door construction and, therefore, the hinges may be mounted in place, or removed, after the door has been assembled. This is of very considerable advantage from the manufacturing standpoint.

Referring to the numbered parts of the accompanying drawing, in which I have illustrated an automobile door embodying my invention, the main supporting frame of the door is made up of the four angle members, 13, which are rigidly secured together in rectangular relationship to form the frame of the door. In this case, these angle members are Z-shaped in cross section, being provided with the oppositely-extending flanges, 14 and 15. To the outwardly-extending flanges, 14, at the bottom and sides of the frame, there are secured the panel-supporting angle members, 17, having outwardly-extending flanges, 18, which, together with the angle members, 13, of the frame, form channels at the side and bottom portions of the door. The door panel, 10, which is pressed to the desired curvature and contour to conform to the curvature of the body, has the flanges, 12, at its side and bottom edges which are bent over the flanges, 19, extending laterally from portions, 18, of the panel-supporting members, 17. At the upper edge of the door, the angle member, 20, is secured to the flange, 14, of the door frame member, 13, and the flange, 21, of this angle member, 20, carries a channel-shaped finishing strip, 22, to which the inturned flange, 11, at the top edge of the door panel, 10, is rigidly secured. It will be noted that the door frame, made up of the angle members, 13, forms a sort of pocket within the door and, if desired, a sheet of metal, 16, may be secured to the inwardly-extending flanges, 15, of the frame members to form the bottom of this pocket.

The hinges, 23, are each provided with a shank, 24, which extends through openings in the flange, 18, of the panel-supporting member, 17, and the angle frame member, 13. The hinge may be provided with a head or shoulder, 25, seating in a recess, 28, formed in the reinforcing plate, 27, applied to the inner surface of the flange, 18, as shown in Fig. 3. A similar reinforcing plate, 26, may be provided and applied to the inner surface of the angle member, 13, and a tubular spacing member, 29, is positioned between the plates, 26 and 27, and around shank, 24, to reinforce the door construction at this point. A nut, 30, is screwed upon the exposed end of the shank, 24, which projects through the angle member, 13. It will be observed that the hinge may be removed from the door by unscrewing this nut, 30, which is readily accessible, and it follows from this that the hinges may be mounted or removed after the assembly of the door has been completed, and, in fact, after the door has been finished and enameled or painted.

I have found that this door is particularly staunch and strong in construction and I believe this to be due, in part, to the fact that I employ a straight frame, the elements of which are straight lines and which does not partake of the curvature of the door panel. In the construction illustrated, the angle members, 13, are separate pieces rigidly united to form the frame, but this frame and the bottom, 16, might be made in a single stamping, without departing from my invention. This frame includes straight angle members, having flanges lapping over the panel-supporting members to which they are secured. This provides a double thickness of metal at the points on which strain is apt to come. The hinge construction is also particularly strong, since the channel of the door is reinforced immediately adjacent the hinges and, when the nut, 30, is screwed up on the shank, 24, the side walls of this channel are pulled against the ends of the spacing member with the result that a very rigid construction is provided. While this mounting is particularly strong and rigid and substantially all of it is concealed within the door, nevertheless, the hinge can be readily removed by unscrewing the nut, 30, which is accessible from the outside of the door.

I am aware that the door construction illustrated in this specification may be varied considerably without departing from the spirit of my invention, and, therefore, I desire to claim my invention broadly, as indicated by the appended claims.

Having thus described my invention, what I claim as new and useful and desire to secure by Letters Patent is:

1. A metal door comprising a main frame of perimetral dimensions closely approximating those of the door at large, a plurality of panel supporting members rigidly secured to said frame and so shaped as to form therewith relatively narrow channel portions at the edges of the door, and a door panel having its edge portions rigidly secured to said members.

2. A metal door comprising a main frame of perimetral dimensions closely approximating those of the door at large, a plurality of relatively narrow Z shaped panel supporting members, each having a flange secured to said frame and an offset flange and a door panel having edge portions thereof rigidly secured to said offset flange.

3. A metal door comprising a main frame, made up of a plurality of Z-shaped angle members rigidly secured together, panel-supporting members rigidly secured to the outer flanges of said angle members, a door panel having its edge portions rigidly secured to said panel-supporting members, and a sheet of metal secured to the inner flanges of said angle members and constituting the inside wall of a pocket formed in the door, the side walls of which are formed by the panel-supporting members.

4. A metal door comprising a frame including a transversely extending top member, a supporting and spacing member secured to the top member of the frame, a door panel, and a finishing strip secured to the upper edge portion of said panel and to said supporting member.

5. A metal door comprising a frame including a tranversely extending top member, a panel-supporting and spacing member secured to the top member of the frame, a door panel, and a channel-shaped finishing strip having its side walls secured one to the upper edge portion of said panel and one to said panel-supporting member.

6. A metal door comprising a frame, made up of a plurality of angle members rigidly secured together, a supporting member secured to the upper angle member of said frame, a door panel, and a channel-shaped finishing strip carried by said member and secured to the upper edge portion of said panel.

7. A metal door comprising on outer door panel, a support, therefor having a vertically extending channel portion near the edge of the door to which one or more hinges are to be attached, a hinge member having a shank extending through both side walls of said channel portion, intermediate the channel ends and fastening means coacting with said shank on the outside of said channel.

8. A metal door comprising an outer door panel, a support therefor having a channel portion near the edge of the door to which one or more hinges are to be attached, a hinge member having a shank extending through said channel portion, said shank having a threaded end projecting outside of the channel, a nut threaded upon said end, and spacing means positioned within said channel, between the side walls thereof and adjacent the shank.

9. A metal door comprising a frame, a plurality of panel-supporting members rigidly secured to said frame and shaped to form with said frame channel portions adjacent edges of the door, a panel rigidly secured to said members, a hinge having a shank extending through one of said channel portions transversely thereof, and means for securing said shank to the channel portion, accessible from the exterior of said channel.

10. A metal door comprising a frame, a plurality of panel-supporting members rigidly secured to said frame and shaped to form channel portions adjacent edges of the door, a panel rigidly secured to said members, a hinge having a shank extending through one of said channel portions, transversely thereof, means for securing said shank to the door accessible from the exterior of said door, and spacing means interposed between the side walls of said channel portion and adjacent said shank.

11. A metal door comprising a frame, made up of a plurality of angle members rigidly secured together, panel-supporting members rigidly secured to said angle members, a door panel having its edge portions rigidly secured to said members, the panel-supporting member and angle member at one edge of the door cooperating to form a channel, a hinge having a shank extending through said panel-supporting member and said angle member, transversely of the channel, and a nut screwed on the projecting end of said shank and engaging the outer surface of said angle member, said nut being accessible from the exterior of the door.

12. A metal door comprising a frame, made up of a plurality of angle members rigidly secured together, panel-supporting members rigidly secured to said angle members, a door panel having its edge portions rigidly secured to said members, the panel-supporting member and corresponding angle member at one edge of the door cooperating to form a channel a hinge having a shank extending through said panel-supporting member and said angle member, transversely of the channel, a nut screwed on the projecting end of said shank and engaging the outer surface of said angle member, said nut being accessible from the exterior of the door, and a tubular spacing member surrounding said shank within the channel and interposed between the panel-supporting member and the inner surface of said angle member.

13. A metal door comprising a rectangular metal main frame, supporting members secured to the four sides of said frame, a finishing strip secured to the supporting member at the upper side of the frame, and a door panel having its upper edge portion secured to said finishing strip and its side and lower edge portions secured to the corresponding supporting members.

In testimony whereof, I affix my signature.

JOSEPH LEDWINKA.